United States Patent Office 2,977,273
Patented Mar. 28, 1961

2,977,273
ROOM TEMPERATURE LAMINATING COMPOSITION AND METHOD OF MAKING LAMINATED PRODUCTS

Otto Hans Korican, 225 W. Lafayette Ave., Baltimore 17, Md.

No Drawing. Filed Nov. 28, 1956, Ser. No. 624,756

10 Claims. (Cl. 154—140)

This invention relates to the bonding of preformed synthetic resin decorative laminates to a supporting surface at or about room temperature and for the purpose of applying a restoring laminate covering thereto by a process which is capable of being carried out readily and economically by relatively unskilled personnel.

Decorative synthetic resin laminated products in a variety of designs and colors are well known, for example, see the U.S. Patent Number 2,084,081 to Herbert A. Faber. These products, known in the art, for example, under the trademark "Formica," generally comprise a decorative, pigmented texture-effect surface sheet which is surfaced with a clear transparent light colored or translucent coating or impregnation of thermosetting resin such as a phenol-formaldehyde condensation product, a urea-formaldehyde condensation product, a melamine-formaldehyde condensation product or equivalent mixture of these materials and which is supported by thermosetting resin-impregnated foundation sheets, usually, about 8 or more, the underlying foundation sheets and texture-effect sheet with or without an additional clear resin facing sheet being consolidated in thermoset condition under relatively high pressure, at least several thousand pounds per square inch and high temperature, about 135 to 185° C.

As a result of high pressure and high temperature consolidation, the commercially available laminate, usually in the form of sheets of 1/16 of an inch thickness, presents a very hard, wear and abrasion resistant thermoset resin surface which is known to be difficult to bond to either similar or dissimilar surfaces.

In order to achieve consistent and efficient adhesion, there has been proposed heretofore, that the hard smooth resin-cured outer surface of the laminate be abraded to remove resin surface material, roughen the surface for mechanical bonding and to increase the undercut areas and indentations for mechanically keying the binding adhesive. These problems of improving adhesion by mechanical abrading have not met with success. Other additional treatments have been suggested.

Thus, as proposed in U.S. Patent 2,536,183, abrading is accompanied by coating with a solvent solution of a liquid phenolic aldehyde condensation product to make the so treated surface more potentially adherent to a phenolic aldehyde adhesive employed for bonding to another surface, such as metal, glass or a cured phenolic surface.

Another proposal made in U.S. 2,663,663 has been to imbed acid-soluble crushed marble below the surface of the resin laminate material prior to curing and thereafter to remove the crushed marble by acid leaching and washing to provide an improvement in the kind of undercut surface.

These methods have the disadvantage in comparison with ordinary abrading methods employing, for example, abrasive grit by sandblasting, abrasive stone, emery paper, a rotating wire brush or scraper, of requiring additional expensive treatment without providing, in respect to the usual commercial adhesives available, any significant improvement in bonding to assure efficient and consistently uniform bonding at room temperature for restoration work alone at home by unskilled personnel with simple crude equipment.

Thus, activation of the abraded surface by treatment with a liquid phenolic resin product as in U.S. 2,536,183 provides a product which maintains its potential-adherency for only 5 to 6 weeks. Thereafter it must be reactivated.

A feature of the present invention lies in the use of a specially compounded adhesive composition which provides improved, more consistent and more efficient bonding at room temperature between the conventionally abraded thermoset and hardened phenolic resin surface and a dissimilar structural surface such as wood, plaster or the like and which obviates the features of pretreatment or special abrasion as thought necessary in the prior art.

The specially compounded adhesive of the invention and its specific mode of application, preferably to a precoated condition of dryness on to both the abraded surface of a thermoset hardened resinous laminate and as a separate dried precoating on the supporting material of wood, metal or plaster provide greatly improved and more consistent bonding under ordinary clamping pressure of at least about 3 pounds per square inch, preferably 8 to 25 pounds per square inch, at room temperature. Bonding is complete after about 1 to 2 hours although undisturbed periods of up to 8 hours are desirable.

The process of the present invention is to be distinguished from prior processes in which cured resin laminates bonded under high pressure to wood supports are utilized as adhesively secured restoration tops such as table-tops, for example. These commercially available "Formica" type table-tops employ ½" to 2" thick wood supports. Their bonding to wood or metal is essentially that between the wood and wood or metal surface and not that of the thermoset resin surface to the underlying support.

The adhesive compositions of the present invention are generally characterized as a mixture of polymerized chloroprene and an alkaline condensed phenol-aldehyde resin. Although these resins are of the type shown in the Saunders patent U.S. 2,376,854, the resins are specifically formulated in a novel manner to render the adhesive suitable at room temperature whereas the adhesive formulated as taught in the Saunders patent cannot satisfy this purpose since it must be set by curing at temperatures of from 300 to 325° F. for a period of about ¼ to ½ hour.

A first distinction lies in the utilization of a phenol aldehyde condensation product which is liquid at room temperature produced by condensing a monohydric mononuclear carbocyclic phenol substituted in the para position with lower alkyl (methyl to butyl), phenyl or cycloalkyl (cyclohexyl) radicals with from about 1.1 to about 1.3 moles of formaldehyde or acetaldehyde in the presence of about 1 to 2% of concentrated ammonium hydroxide as a catalyst, the condensation proceeding under reflux to produce a liquid resin product containing at least 2, preferably up to 4 units of substituted phenol (cresol, for example), into the condensed resin molecule. Water is carefully removed from the liquid phenolic resin product after neutralizing the reaction mixture. The liquid resin product is in the B stage of condensation, in which stage it is insoluble in water but soluble in organic solvents such as acetone, methyl ethyl ketone, benzene, toluene, xylene, etc. or mixtures of these.

The removal of water is readily accomplished by evaporation under vacuum at temperatures preferably below 85° C. in order that the condensation stage not continue further under the influence of heat.

At the point of neutrality after the mixture with a mineral acid, there is a tendency for the separation of formed salt from the reaction mixture. The mixture may be concentrated to the syrup stage as long as it remains liquid. The liquid resin is filtered to remove precipitated salt. Such filtration is preferably effected after the mixture is taken up in an anhydrous organic solvent such as benzene, xylene, naphtha, or the like.

The tendency of the dissolved phenolic resin in the "B" stage in the organic solvent to retain quantities of said solvent after this material is applied as a coating per se is a factor which has heretofore prevented efficient utilization of this material as an adhesive at room temperatures.

It has been discovered that about 20% to 40% of the more highly condensed phenolic resin which is solid at room temperature may be dissloved in the liquid phenolic resin in order to improve the release of solvent, thereby effecting more rapid development of adhesion.

Preferably, the solid phenolic resin which is dissolved in the liquid resin is of the same type of substitution in the phenol as the liquid resin. For example, it has been found that para-phenylphenol condensed with about 1.3 moles of formaldehyde in the presence of 1% concentrated ammonium hydroxide wherein the reaction is carried out to a point to produce a solid resin having a melting point of about 140°-165° F. provides a highly satisfactory solid product which is dissolved in an amount of 40 parts by weight of this solid resin in 100 parts by weight of the resin, of the same constitution but in the liquid form.

In producing a liquid solution of the solid phenolic resin in the liquid phenolic resin, it has been found, quite unexpectedly, that an aliphatic substituted liquid phenolic resorcinol, e.g. paratertiary butyl phenol condensed with an aldehyde and formulated with a solid resinoid in accordance with the invention effects a better bonding result when in combination with a carbocyclic substituted phenol condensation product as the solid resin. Thus the formaldehyde condensation product of either para-cyclohexyl phenol or para-phenyl phenol in the "B" stage liquid condition is mixed with a tertiary butyl phenol aldehyde solid resin.

Conversely, the dissolving of an aliphatic substituted phenol condensation product as the solid constitutent in a liquid carbocyclic substituted phenol aldehyde condensation as the liquid product provides less desirable results in the laminating application of the adhesive.

Further, if both the liquid component and the solid component are the alkyl aliphatic phenol products carried to different condensation states for solid and liquid respectively, for example both para-tertiary butyl phenol, then the bonding results in combination with the polychloroprene ingredient are not as good.

Similarly, if both solid phenol components and liquid components utilized to form the liquid mixture are from the cyclic substituted phenol, e.g. para-phenylphenol, equally good results for room temperature bonding are not obtained.

Accordingly, it is a feature of the invention that the liquid component of the phenolic condensation product and the solid component of the phenolic condensation product be substituted with different types of hydrocarbon constituents, the two types of hydrocarbon constituents being chain hydrocarbon constituents and cyclic hydrocarbon constituents.

The adhesion which is conferred by the phenolic ingredients in combination is greatest with those hydrocarbon substituted phenolics in which the substitution occurs in the para position, para to the hydroxyl group of the phenol. With ortho or meta substitution, for example, uniform and satisfactory results are not achieved.

The polymerized chloroprene ingredient of the present invention is preferably one of the commercially available forms having a relatively high hardness value (durometer hardness) and in which there is incorporated a highly active curing agent which accelerates the setting of both of the phenolic components as well as the neoprene component in the combination of these three components in the adhesive.

The preferred highly reactive accelerator is a combination of butyraldehyde-monobutylamine and litharge. Effective proportions on the basis of the weight of the neoprene present for these accelerated elements in combination are about 5 to 15 parts of litharge and about 5 to 10 parts of butyraldehyde-monobutylamine. Other amines may be condensed with butyraldehyde to give similarly good results, for example the condensation product of aniline and butyraldehyde.

The polychloroprene ingredient may be partially replaced with up to about 20% of adhesive chlorinated conjugated diolefin polymer cements. The composition of this specially added ingredient contains 30% isoprene to 70% styrene which is chlorinated at about 24% to 28% by weight chlorine content and has the advantage of causing an increase in bonding strength with time. Where such blend is made of the polychloroprene and the chlorinated isobutylene styrene copolymer, an additional amount of carbon black of up to about 15% by weight of the rubbery component is introduced with approximately an equal amount of sulphur. Preferably, the mixture of the chlorinated rubbery copolymer, carbon black and sulphur is melted and pre-vulcanized at about 150° F. for about four to five minutes, whereafter it is milled with the neoprene ingredient, the accelerator therein and these ingredients in combination are added to the phenol concentrate in the liquid form.

An example of a typical embodiment of the invention is given below:

EXAMPLE I

The neoprene component is made up in accordance with the following formula:

| | Parts by weight |
|---|---|
| Polymerized chloroprene (neoprene) | 500 |
| Calcined magnesia | 50 |
| Sulphur | 5 |
| Butyraldehyde | 30 |
| Litharge | 35 |
| Semi-reinforcing carbon black | 200 |

The above ingredients are blended in a rubber mill to form a continuous sheet. The magnesia is added at the end. If desired, up to about 10 parts of zinc oxide and a conventional anti-oxidant, such as phenyl alpha naphthylamine may be added during the finishing stages of sheeting.

The liquid phenolic component

A liquid phenol formaldehyde resin in the "B" stage is prepared by condensing 1 mol of para-phenylphenol in the presence of 2% ammonium hydroxide and with 1.35 moles of formaldehyde (aqueous formalin) under reflux conditions at the boiling temperature of the water until a liquid resin separates which is soluble in alcohols and coal tar solvents. This liquid resin is separated from the water. The ammonia is neutralized with hydrochloric acid. Residual water in the resin is removed by evaporation under vacuum at temperatures below 80° C. The temperature drops from about 80° C. to about room temperatures after about three hours of vacuum evaporation.

A further sample of a lacquered phenolic resinoid is prepared in accordance with the same procedure as outlined hereinabove except that paratertiary butyl phenol is employed instead of para phenyl phenol to provide a resin which is liquid at room temperature.

The solid phenolic resin component

In the previous preparations of liquid phenolic resinoids from para phenyl phenol and para tertiary butyl phenol, the same procedures are carried out with the same reactants and same proportions except that the time of reaction is extended under heating to provide by bead sampling a fusible product having a melting point of at least between about 135° F. to about 155° F. This product is solid upon cooling to room temperature.

The melting point of para phenyl phenol resinoid varies from about 145°–160° F.

To 100 parts of each of the liquid phenolic resins prepared in the preceding paragraph, there are added 35 parts of each of the solid phenolic resins.

The liquid para-tertiary butyl phenol formaldehyde resin has a melting point of about 50° F.

The foregoing procedures produce the liquid resins and solid resins respectively of the tertiary butyl substituted phenol resins and the phenyl substituted resins, respectively. Thus these resins are blended each with the liquid resin of the same substitutions and with the liquid resin of different substitutions.

Each of these mixed solid-liquid resins is then blended in a proportion of 100 parts of the liquid phenolic resin combination, 300 parts of the neoprene base component and about 400 parts of toluene as a solvent.

Phenolic laminate panels were abraded on their reverse side and coated with a coating of about five to eight milligrams per square inch of solids using the above solution and dried. (The abraded back side constitutes a phenol aldehyde thermoset surface.)

The adhesive coated phenolic laminate panels were pressed by hand pressure (5 to 8 pounds) against each other using the following adhesive combinations of the phenolic constituents.

(1) Para-tertiary butyl phenol liquid resin combination with para-phenylphenol solid and neoprene base against same.

(2) Para-phenylphenol liquid resin combination with para-tertiary butyl phenol solid and neoprene base against same.

(3) Para-tertiary butyl phenol liquid resin combination with para-tertiary butyl phenol solid and neoprene base against same.

(4) Para-phenylphenol liquid resin combination with para-phenylphenol solid and neoprene base against same.

The best adhesion developed was that with samples 1 and 2. The adhesion developed with samples 3 and 4 could be improved by heating to about 150° C. utilizing a hot iron. But such means for attaining adhesion is not practical for home repair work.

EXAMPLE II

In this example, the neoprene base of Example I is modified by adding to said neoprene base formula 20% by weight thereof of a chlorinated copolymer of butadiene 70% and styrene 30% thereafter chlorinated to provide a chlorine content of about 25%. Mixtures were made with phenolic resinoid Formulae 1 and 2 from Example I.

Satisfactory adhesion of phenolic laminate panels coated each with the component adhesive containing liquid phenolic body, solid phenolic body and modified neoprene base component in the same proportions as in Example I, was found to provide the same excellent adhesion at room temperature as though the coating had been applied to the phenolic thermoset side of the phenolic laminate sheets. Each phenolic laminate panel is coated with about 5 to 8 milligrams of adhesive film on a dry set base.

In the foregoing examples, the preferred method of operation is to coat both of the panels with about the same thickness of coating. If only one panel is coated the adhesion which is provided is not satisfactory. It is essential in the foregoing examples that all of the solvent be evaporated from the adhesive coating before the panels are pressed in airtight engagement with each other.

A similar result is obtained if, instead of pressing two Formica panels together in the manner described above, a coated Formica panel is pressed against a plywood base or a wooden base as is normally used in the repair of a table top.

A wooden base such as a table top must be carefully prepared by cleaning and sanding the upper surface thereof in order to eliminate dirt, grease and provide a clean, plane surface for the application of the adhesive in organic solvent solution.

It is preferable that the Formica laminate, the phenol formaldehyde thermoset impregnated cellulosic laminate be lightly sanded to provide improved grip for the application of the adhesive coating of the invention.

The adhesive which is applied to the thermoset phenol base may be modified while still obtaining good bonding results at room temperature and under the slight pressure required to provide an airtight seal between the surfaces being laminated. It has been found that a coating of an acid catalyzed phenol formaldehyde resin which goes under the trade name of Durez 12041 liquid resin may be utilized as a pre-coat on the thermoset phenolic resin surface of the Formica laminate. This is surprising since the Durez 12041 liquid resin is a high viscosity concentrate solution of a one step thermoset phenol formaldehyde resin with an acid accelerator. This Durez resin applied to the wood surface does not provide a satisfactory method for operation because the Durez resin dries extremely slowly. Further, the adhesion on the wood surface is not as good. The adhesion to the wood surface coated with the adhesive of the present invention in combination with the film of Durez pre-coat on the Formica laminate provides instant bonding, which is surprising indeed.

It is not possible to provide any explanation of the above but it appears thta the ammonia condensed phenolic resin components of the present invention have in themselves unique bonding characteristics, particularly with respect to the bonding to acid catalyzed phenolic resin films as well as to the thermoset phenolic resin surfaces, wood surfaces and ceramic surfaces.

It has been found by extensive experimentation that the development of immediate tight bonding adhesion is achieved by pre-coating both of the surfaces. This is particularly necessary where one of the surfaces is a thermosetting phenolic resin impregnated cellulosic surface such as with Formica, Textolite, and other trademarked commercial laminates.

I claim:

1. An adhesive comprising a mixture of an alkaline condensed fusible phenol formaldehyde condensation product which is solid at room temperature and which has a melting point of at least about 135° F. with an alkaline condensed fusible phenol formaldehyde condensation product which is liquid at room temperature, each of said solid and liquid phenol formaldehyde condensation products prepared from a para hydrocarbon substituted phenol in which the hydrocarbon radical is selected from the group consisting of aliphatic radicals and carbocyclic radicals and in which only one of said solid and liquid products has an aliphatic radical, and a formaldehyde in a molar ratio of about 1:1 to 1:3, together with about three times the weight of said solid and liquid products of polymerized chloroprene and a litharge accelerator for said mixture, there being from about 20 parts to about 40 parts of said solid phenol-formaldehyde condensation product dissolved in 100 parts of said liquid phenol formaldehyde condensation product.

2. An adhesive as claimed in claim 1, wherein said accelerator comprises a mixture of litharge and the reaction product of butyraldehyde and monobutylamine.

3. A laminating adhesive as claimed in claim 1, wherein said phenol of said solid condensation product is para carbocyclic substituted phenol and said phenol of said liquid condensation product is a para aliphatic substituted phenol.

4. A laminating adhesive as claimed in claim 1, wherein said phenol of said solid condensation product is paraphenyl phenol and said phenol of said liquid condensation product is para tertiary butyl phenol.

5. A laminating adhesive as claimed in claim 1, wherein said phenol of said solid condensation product is paraphenyl phenol and said phenol of said liquid condensation product is a para tertiary amyl phenol.

6. A method of bonding at room temperature a cured abraded surface of a phenol aldehyde impregnated cellulose laminate to the surface of a base comprising coating each of said surfaces of laminate and base with an organic solvent solution of an adhesive consisting essentially of a mixture of an alkaline condensed fusible phenol aldehyde condensation product which is solid at room temperature, having a melting point of at least about 135° F., with an alkaline condensed fusible phenol aldehyde condensation product which is liquid at room temperature, each of said solid and liquid phenol condensation products prepared from a para hydrocarbon substituted phenol in which the hydrocarbon radical is selected from the group consisting of aliphatic radicals and carbocyclic radicals and in which only one of said solid and liquid products has an aliphatic radical, and an aldehyde in a molar ratio of about 1:1 to 1:3, there being from about 20 parts to about 40 parts of said solid phenol-formaldehyde condensation product dissolved in 100 parts of said liquid phenol formaldehyde condensation product, and with about three times the weight of said combined liquid and solid phenol condensation products of polymerized chloroprene containing a litharge accelerator for said adhesive, drying each of said coatings on said surfaces and bringing the surfaces together in air tight relationship to bond the same at room temperature.

7. A method as claimed in claim 6 wherein said accelerator comprises a mixture of litharge and the reaction product of butyraldehyde and monobutylamine.

8. A method as claimed in claim 6 wherein said phenol of said solid condensation product is a para carbocyclic substituted phenol and said phenol of said liquid condensation product is para aliphatic substituted phenol.

9. A method as claimed in claim 6 wherein said phenol of said solid condensation product is paraphenyl phenol and said phenol of said liquid condensation product is para tertiary butyl phenol.

10. A method as claimed in claim 6 wherein said phenol of said solid condensation product is paraphenyl phenol and said phenol of said liquid condensation product is para tertiary amyl phenol.

References Cited in the file of this patent

UNITED STATES PATENTS

| | | |
|---|---|---|
| 1,597,539 | Novotny et al. | Aug. 24, 1926 |
| 1,697,182 | Hall et al. | Jan. 1, 1929 |
| 2,084,081 | Faber | June 15, 1937 |
| 2,351,716 | Smith | June 20, 1944 |
| 2,376,854 | Saunders et al. | May 22, 1945 |
| 2,445,737 | Albert | July 20, 1948 |
| 2,485,097 | Howland et al. | Oct. 18, 1949 |
| 2,536,183 | Jamieson | Jan. 2, 1951 |
| 2,557,826 | Keaton et al. | June 19, 1951 |
| 2,709,148 | Jacque | May 24, 1955 |
| 2,772,197 | Kozdemba | Nov. 27, 1956 |
| 2,783,176 | Boicey | Feb. 26, 1957 |
| 2,801,198 | Morris et al. | July 30, 1957 |

OTHER REFERENCES

An Outline of Organic Chemistry (revised) by Degering, Nelson, Harrod and others. Published in 1937 by Barnes and Noble, Inc., New York, page 260.